United States Patent Office 2,789,954
Patented Apr. 23, 1957

2,789,954

PROCESS FOR MAKING PEROXYMONO-SULPHURIC ACID

Eric T. Fell, Ambergate, England, assignor to Stevensons (Dyers) Limited, Ambergate, England, a corporation of Great Britain No Drawing. Application December 14, 1953, Serial No. 398,195

4 Claims. (Cl. 252—186)

This invention relates to a process for making peroxymonosulphuric acid and products produced thereby.

Peroxymonosulphuric acid has been heretofore known experimentally, but, so far as I am aware, no practical use has been made of it until that described in my copending applications Ser. No. 228,143, filed May 24, 1951, now Patent 2,701,178, and Ser. No. 282,902, filed April 17, 1952, now Patent 2,739,034. Each of these applications relates to the treatment of wool by mixtures containing such acid to render it shrink-resistant. Practical operation of these processes and, in general, commercial use of the acid requires that it be sufficiently stable to be shipped and handled. The term "peroxymonosulphuric acid" refers to the same substance as the term "permonosulphuric acid," which latter term appears in said Patents 2,701,178 and 2,739,034.

The principal object of the present invention accordingly is to provide a simple efficient process for the manufacture of peroxymonosulphuric acid and compositions containing same, and to produce a product which may be shipped and handled commercially.

The invention accordingly comprises the novel products as well as the novel processes and steps of processes according to which such products are manufactured, the specific embodiments of which are described hereinafter by way of example and in accordance with which I now prefer to practice the invention.

I have found, in accordance with my invention, that regulated amounts of concentrated sulphuric acid and hydrogen peroxide may be flowed together to produce a mixture of peroxymonosulphuric acid, sulphuric acid and water, and that the mixture should be cooled quickly as it flows to inhibit substantially further reaction. The cooled flowing mixture is then diluted with cool water to produce a solution which may be employed practically.

I have found that the solution mentioned will have a stability so that it may be shipped and handled for use in various commercial processes. Thus, such solutions may be used, for example, but without limitation, in the processes of the invention of my applications referred to above.

In carrying out my process, hydrogen peroxide is mixed with an equal amount, or larger amount, of sulphuric acid containing at least 88% (sp. gr. 1.7) of $H_2SO_4$ by weight.

Hydrogen peroxide solutions of varying concentrations may be employed as reactants.

Where solutions of aqueous hydrogen peroxide of less concentration than 50% by weight are employed, the reaction time is substantially instantaneous, producing a corresponding rise in temperature and the cooling zone may be situated substantially at the point of mixing.

In general a flow of one volume of hydrogen peroxide to three or four volumes of sulphuric acid (sp. gr. 1.84) is satisfactory to give a high conversion of hydrogen peroxide into peroxymonosulphuric acid. The conversion is incomplete and there is always a small amount of hydrogen peroxide in the diluted product as formed.

Where smaller proportions of sulphuric acid are used we find that the conversion is correspondingly less, and so, when the flow of sulphuric acid is less in volume than that of hydrogen peroxide, the yield of peroxymonosulphuric acid is correspondingly low.

The relationship between sulphuric acid and hydrogen peroxide is better understood by consideration of the following table, which clearly shows that as the amount of sulphuric acid in relation to hydrogen peroxide decreases, the conversion into peroxymonosulphuric acid is reduced, the smallest conversion to peroxymonosulphuric acid in the table occurring when the peroxide volume exceeds that of sulphuric acid.

TABLE

| Unit volume flow per sec. | | Conversion of $H_2O_2$ into peroxymono-sulphuric acid, percent |
|---|---|---|
| Sulphuric acid, Sp. Gr. 1.84 | 90% $H_2O_2$ | |
| 10 | 1.6 | 94.6 |
| 10 | 2.5 | 93.0 |
| 10 | 4.0 | 80.6 |
| 10 | 6.3 | 57.6 |
| 10 | 9.0 | 30.2 |
| 10 | 12.0 | 26.2 |

The concentration of sulphuric acid used is critical. Thus, solutions of sulphuric acid less than 88% by weight (sp. gr. 1.7) do not give a satisfactory conversion of hydrogen peroxide into peroxymonosulphuric acid where the stream of reactants prior to mixing are at room temperature.

The process is conveniently carried out in a continuous manner by running together a stream of hydrogen peroxide at a substantially uniform velocity and a stream of concentrated sulphuric acid at a substantially uniform velocity. As indicated above, the volume of the streams may be equal but the volume of the concentrated $H_2SO_4$ stream is preferably larger than that of the hydrogen peroxide. An exothermic reaction takes place and the flow should be regulated so that the temperature of the mixture rises quickly to at least about 50° C. The rate of flow is such that this temperature exists preferably for several seconds and the flowing mixture then enters the cooling zone where it is preferably cooled to room temperature. Prolonged contact of the concentrated sulphuric acid and hydrogen peroxide mentioned in the proportions indicated beyond the point where the maximum yield of peroxymonosulphuric acid is produced will result in a loss of oxygen and corresponding reduction in the yield of peroxymonosulphuric acid. In general the rise of temperature is instantaneous and the chemical conversion takes place almost immediately. Accordingly, as stated, the reacting time prior to cooling occupies only several seconds.

Substantially immediate dilution is important because of the instability and hazardous character of the product in the undiluted form. Thus, a product formed of 47% sulphuric acid, 43% peroxymonosulphuric acid and 5% water and 5% hydrogen peroxide is hazardous because it will cause fires in combustible materials. Thus, if cotton or wool is brought in contact with such solution, it will ignite and burn. Stable compositions which may be used in practice I have found should contain from an appreciable amount to about 15 parts of peroxymonosulphuric acid, from an appreciable amount to about 15 parts of hydrogen peroxide, from an appreciable amount to about 25 parts of sulphuric acid and the balance water. All parts mentioned are by weight. This composition is suitable for the treatment of wool to render it shrink-resistant, as set forth in my said applications above. It is useful for various other purposes.

The method of dilution we have found to be the most practical is to pump the correct proportion of water to peroxide and sulphuric acid used into the lower portion of the cooling system beyond the zone in which the peroxymonosulphuric acid is formed so that the diluted peroxymonosulphuric acid issues from the system. According to another embodiment of the invention two cooling systems in series are provided, the first being used for cooling the mixture and the second for dilution of this mixture.

The following are examples of the process as I now prefer to practice it. It is to be understood that these examples are illustrative and the invention is not to be considered as restricted thereto except as indicated in the appended claims.

Unless otherwise indicated all proportions are by weight.

Example 1

Streams at room temperature of concentrated sulphuric acid (sp. gr. 1.84) and 50% by weight aqueous hydrogen peroxide were flowed together at 20 and 7.3 volumes per minute respectively. The mixing took place at the mouth of a water-cooled condenser. As it flowed through the condenser the mixture had a reaction time of one second before cooling to about 15° C. The temperature of the water used for cooling was 15° C.

The cooled mixture which issued from this condenser was then mixed with a stream of water at about 15° C. flowing at the rate of 160 volumes per minute and flowed into a second water-cooled condenser using water at about 15° C.

The solution flowing from the second condenser contained approximately 6% by weight of peroxymonosulphuric acid, 81.5% water, 12.0% sulphuric acid and 0.5% by weight of unconverted hydrogen peroxide and was sufficiently stable for commercial requirements. The content of peroxymonosulphuric acid was substantially unchanged on storage for 30 days and the conversion was over 80% of the peroxide used with a yield of 80%. The stability of this solution was two weeks.

The stability test for this example and the succeeding examples was made by titration of the solution to determine its content of peroxymonosulphuric acid. When an appreciable change, viz. a decrease of 20% in the peroxymonosulphuric acid content, was noted in the content, the period at which that change commenced was given as the stability period.

Example 2

Streams at room temperature of concentrated sulphuric acid (sp. gr. 1.84) and 35% by weight aqueous hydrogen peroxide were flowed together at 20 and 6.8 volumes per minute respectively.

The flow of both chemicals was so arranged that the commingling took place well within the cooling zone of a condenser jacketed with running water at approximately 10° C. Cooling was substantially immediate after mixing.

The cooled mixture which issued from the condenser was then led into a tank containing water at approximately 10° C. which was kept cool by ice. This dilution was effected by taking 2,000 volumes of water for every 200 volumes of sulphuric acid originally taken.

The diluted solution so obtained approximately 2.8% by weight of peroxymonosulphuric acid, 84% water, 13% sulphuric acid and 0.2% by weight of hydrogen peroxide and was quite stable for commercial purposes. The conversion was over 80% of the peroxide used. The yield was about 80%. The stability of this solution was three weeks.

Example 3

Streams at room temperature of concentrated sulphuric acid (sp. gr. 1.84) and 90% by weight aqueous $H_2O_2$ were flowed together at 20 and 7.3 volumes per minute respectively. The mixing took place at the mouth of a water-cooled condenser, with the water being at 15° C., which was so arranged that the mixture had a reaction time of about 2 seconds before cooling.

The cooled mixture issuing from the condenser was then led into a tank of water at approximately 10° C., which was kept cool by ice. This dilution was effected by taking 3,000 volumes of water for every 200 volumes of sulphuric acid originally taken.

The diluted solution so obtained contained approximately 7% by weight of peroxymonosulphuric acid, 87.6% water, 4.8% sulphuric acid, and 0.6% by weight of hydrogen peroxide and was quite stable for commercial purposes. The conversion was over 80% of the peroxide used. The yield was about 80%. The stability of this solution was six weeks.

Example 4

Concentrated sulphuric acid, sp. gr. 1.84, and 90% by weight hydrogen peroxide were flowed together at 20 and 12 volumes respectively into the mouth of a water cooled condenser, at such a point that the mixture had a reaction time of approximately three seconds before entering the cooling zone.

The cooled mixture was then flowed together with 140 volumes of water at a temperature of 10° C. and kept cool by an ice jacket.

The diluted solution so obtained contained approximately 15% peroxymonosulphuric acid and was stable for 4 days.

Chemical analysis showed that over 70% of the hydrogen peroxide originally taken had been converted into peroxymonosulphuric acid. The yield was about 70%.

Example 5

Streams at room temperature of concentrated sulphuric acid (sp. gr. 1.84) and 90% by weight hydrogen peroxide were flowed together at 20 and 12 volumes respectively into the mouth of a water cooled condenser, cooled at 10° C., at a point such that the mixture had a reaction time of approximately three seconds before entering the cooling zone.

The cooled mixture was then led into 200 volumes of water at a temperature of 10° C. kept cool by an ice jacket.

The diluted solution so obtained contained approximately 12.0% of peroxymonosulphuric acid, 82.3% water, 4.6% sulphuric acid and 1.1% hydrogen peroxide. It was stable for 30 days. The yield was above 80%.

The water employed in the above examples is a good quality of soft water. Hard water and water containing large amounts of impurities would give a less stable product.

What I claim is:

1. A process which consists in, flowing together regulated amounts of concentrated sulphuric acid containing not less than about 88% of said acid and hydrogen peroxide under reaction temperature to produce peroxymonosulphuric acid, sulphuric acid, water and hydrogen peroxide, cooling the resulting mixture several seconds after such reaction to inhibit substantially further reaction and diluting the flowing mixture with water to produce a solution containing not more than 15% peroxymonosulphuric acid.

2. A process which consists in, bringing together regulated streams of concentrated sulphuric acid containing not less than about 88% of said acid and hydrogen peroxide in proportions such that the sulphuric acid is in excess of the required stoichiometrical amount to the hydrogen peroxide, cooling the combined streams several seconds after reaction thereof and diluting the mixture with water to produce a solution containing not more than 15% peroxymonosulphuric acid.

3. A process which consists in, flowing together regulated amounts of concentrated sulphuric acid containing not less than about 88% of said acid and hydrogen peroxide under reaction conditions to produce peroxymonosulphuric acid, sulphuric acid, water and hydrogen peroxide, rapidly cooling the resulting mixture to room temperature then as it flows to inhibit substantially further reaction and diluting the flowing mixture with water to produce a solution containing not more than 15% peroxymonosulphuric acid.

4. A process which consists in, bringing together regulated streams of concentrated sulphuric acid containing not less than about 88% of said acid and hydrogen peroxide in proportions such that the sulphuric acid is in the proportion of a unit volume flow per second of about 10 volumes of sulphuric acid to about 4 volumes of 90% to about 30% hydrogen peroxide, quickly cooling the combined streams after reaction thereof and diluting the mixture with water to produce a solution containing not more than 15% peroxymonosulphuric acid.

References Cited in the file of this patent
UNITED STATES PATENTS 2,663,621   Greenspan _____ Dec. 22, 1953

OTHER REFERENCES

"Systematic Inorganic Chemistry," Yost and Russell, Prentice-Hall Inc., 1944, N. Y., page 372.